United States Patent
Alinat

(10) Patent No.: US 6,885,612 B2
(45) Date of Patent: Apr. 26, 2005

(54) PANORAMIC AUDIO DEVICE FOR PASSIVE SONAR

(75) Inventor: Pierre Alinat, Vence (FR)

(73) Assignee: Thales, Paris (FR)

( * ) Notice: Subject to any disclaimer, the term of this patent is extended or adjusted under 35 U.S.C. 154(b) by 49 days.

(21) Appl. No.: 10/378,070

(22) Filed: Mar. 4, 2003

(65) Prior Publication Data

US 2004/0174771 A1 Sep. 9, 2004

(51) Int. Cl.[7] .................................................. G01S 3/80
(52) U.S. Cl. ................................... 367/124; 367/119
(58) Field of Search .............................. 367/119, 124, 367/132, 121; 381/56

(56) References Cited

U.S. PATENT DOCUMENTS

| | | | | |
|---|---|---|---|---|
| 3,789,353 A | * | 1/1974 | Hunter et al. ............... | 367/132 |
| 3,940,769 A | * | 2/1976 | Sherman et al. ............ | 342/427 |
| 6,069,585 A | * | 5/2000 | Lanciaux ..................... | 342/443 |
| 6,222,927 B1 | * | 4/2001 | Feng et al. ................. | 381/94.2 |
| 6,424,719 B1 | * | 7/2002 | Elko et al. ...................... | 381/1 |

FOREIGN PATENT DOCUMENTS

DE          1566857     * 11/1967

\* cited by examiner

*Primary Examiner*—Ian J. Lobo
(74) *Attorney, Agent, or Firm*—Lowe hauptman Gilman & Berner, LLP

(57) ABSTRACT

The invention concerns panoramic audio devices to process the impulsive signals received by passive sonars. It consists in isolating, in each beam, impulsive signals in the frequency and time domains and then filtering them according to the characteristics of the human ear. All left and right signals are then summed in order to be listened to in a headset. It allows rapid processing of impulsive signals.

8 Claims, 1 Drawing Sheet

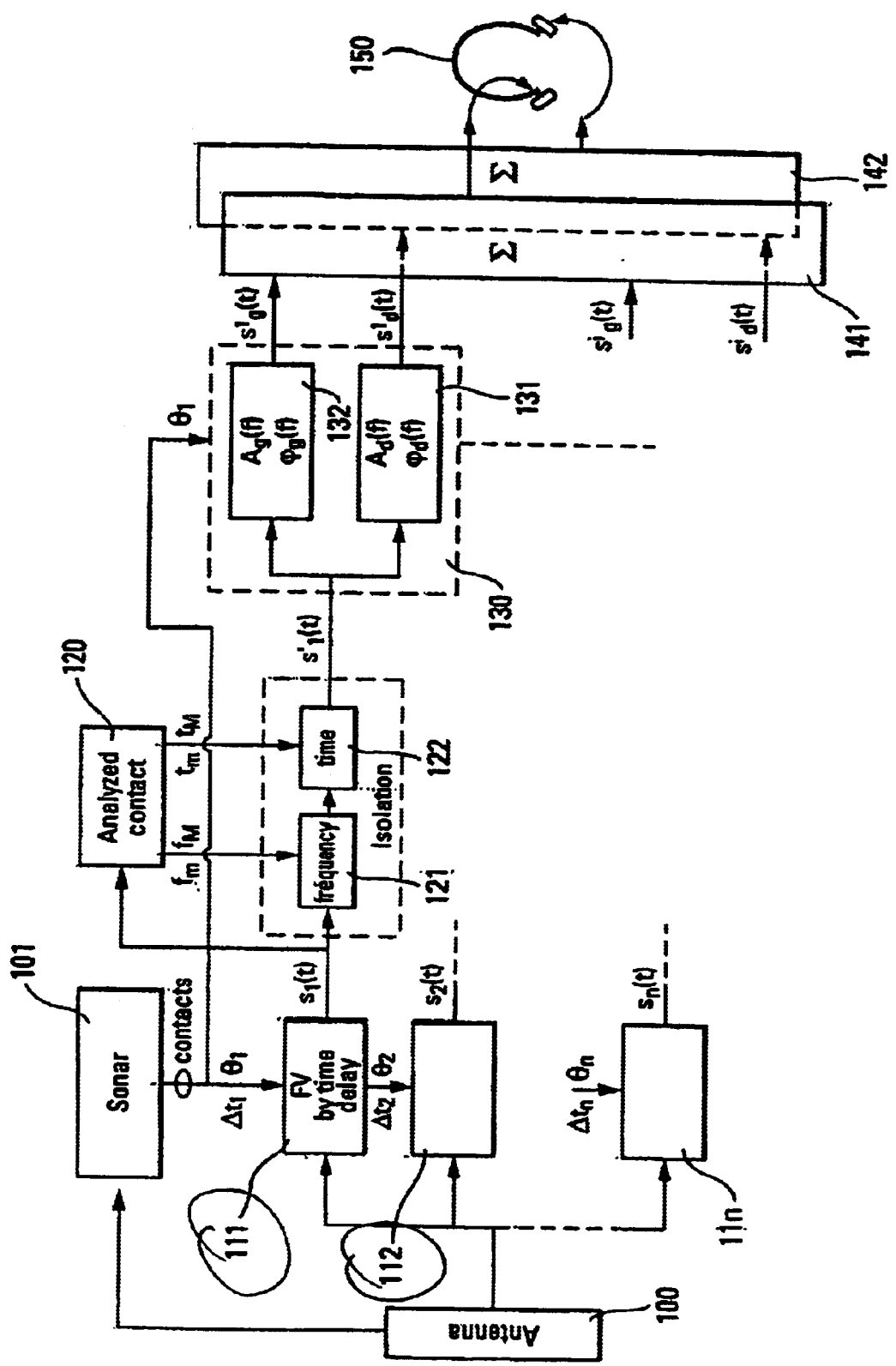

PANORAMIC AUDIO DEVICE FOR PASSIVE SONAR

FIELD OF THE INVENTION

The invention relates to panoramic audio devices for passive sonars used in the domain of recognition of a submarine noisemaker by sonar operators with audio headsets. In particular, it relates to the devices referred to as audio "beams" in the context of recognition of impulsive noise.

BACKGROUND OF THE INVENTION

In a sonar, an audio beam is a beam directed in the direction of a "contact" in order to be able to hear the noise emanating from this contact. This solution is satisfactory to the extent that, for steady noise, the operator can effectually listen to all noteworthy contacts sequentially. In the case of panoramic surveillance of impulsive noise, a simple solution consists in allowing the operator to listen to an impulsive noise after storing it (the decision to store it having been taken according to azimuth, spectrum, duration, etc. criteria). This solution is to be adopted when the operator performs additional analysis. However, in this solution, the audio signals are not used to sort contacts. This solution must thus be complemented by another audio system allowing such sorting. Given that impulsive noises, by definition, last only a short time, a panoramic audio system is required that is capable of hearing noises from the entire horizon and this, of course, without losing the advantage of beamforming. This need is all the more pressing in a combat situation, notably for a submarine, that must be able to rapidly distinguish between an aircraft passing overhead and a torpedo coming towards it.

An audio device that meets this need for panoramic listening to sources of noise in real-time is hitherto unknown.

SUMMARY OF THE INVENTION

The object of this invention, a panoramic audio device for passive sonar used to study impulsive noises, of the type comprising a "contact" audio processing chain, is mainly characterized by the fact that this chain comprises:

A device for forming beams in the direction of each "contact".

At least one module for isolating (in the frequency and time domains) each "contact" signal in each beam.

At least two modules for right-left processing of each signal thus isolated, to provide, on the basis of filtering according to the characteristics of the human ear, two left and right signals corresponding to each isolated "contact" signal.

A summation device for all left signals.

A summation device for all right signals.

A binaural listening device receiving the summed signals on a left transducer and on a right transducer.

Another characteristic is that the isolation module receives the spectral and temporal limits of the pulse from a module that analyzes the "contact" in the frequency and time domains.

Another characteristic is that the "contact" analyzer module performs spectral analysis and time analysis by an envelope description.

Another characteristic is that the isolation module subtracts background noise from the "contact" pulse.

Another characteristic is that the amplitude and phase transfer functions of the left-right processing modules are obtained on the basis of the characteristics of the human ear.

Another characteristic is that the direction of each contact provided by the sonar is determined by the azimuth of the sonar beam in which the contact is located.

Another characteristic is that the direction of each contact is complemented by the tilt angle of the sonar beam in which the contact is located.

The proposed device, at each detection of an impulsive noisemaker (contact), forms a beam in its direction, then, in accordance with the object of the invention, creates two signals $s_g(t)$ and $s_d(t)$ such that the operator, receiving $s_g$ in the left earphone and $s_d$ in the right earphone, has the same impression of direction between himself and the noisemaker as in the water with respect to the vessel, the axis of the operator representing the axis of, the vessel. The operator can thus distinguish several impulsive noises detected, even if they overlap in time.

Other specific features and advantages of the invention will be clearly shown by the following description, in conjunction with the single FIGURE showing the processing chain of the device that is the object of the invention.

BRIEF DESCRIPTION OF THE DRAWINGS

FIG. 1 is a block diagram of a panoramic audio device for passive sonar according to the present invention.

DETAILED DESCRIPTION OF THE PRESENT INVENTION

With reference to FIG. 1, the device receives signals from the passive antenna (100) from which are formed, in known manner, by time-delay, n beams directed in the n azimuths $\theta_i$ ($1 \leq i \leq n$) for which the sonar processing chain (101) has given a contact. To this goal, each beamforming module 111, ... 11n receives duration time, $\Delta t_i$, and azimuth, $\theta_i$, and provides the signals $s_i(t), \ldots s_n(t)$ for a duration slightly longer than that of the contact.

Each signal, $s_i(t)$, is then processed to isolate, in the frequency (module 121) and time (module 122) domains, the noise pulse proper, after analysis in module 120 n signals ($s'_i(t)$) are thus obtained.

Each signal ($s'_i(t)$) is then processed again in module 130 by filtering (modules 131 and 132) according to azimuth, $\theta_i$, to produce two left and right signals ($s^i_g(t)$ and $s^i_d(t)$).

At the end of the chain, the n signals ($s^i_g(t)$) and n signals ($s^i_d(t)$) are summed in two modules (141 and 142) to provide two left and right signals in the earphones of the audio headset (150).

The signals output by the antenna sensors (100) are converted into digital samples. In a known manner, the formation of the beams (11i) consists in delaying the sensor signals to put them into phase in relation to each azimuth ($\theta_i$) in which the sonar has detected a contact. The sonar (101) provides the modules (11i) with the values of $\theta_i$, and the value of $\Delta t_i$ corresponding to the duration of the contacts in such manner as to form the beams for a duration framing the contact.

Each beam signal ($s_i(t)$) is then processed in such manner as to isolate the noise pulse in the frequency and time domains. To this goal, the frequency of each signal ($s_i(t)$) is analyzed in module 120 for spectral analysis over the entire audible band, and analyzed in the time domain by an envelope description. In particular, the frequency at which the signal is maximum and the amplitudes that exceed a certain threshold with respect to background noise are searched for. The minimum frequency, $f_m$, and maximum frequency, $f_M$, are deduced and also the times, $t_m$ and $t_M$, that demarcate the useful signal. The isolation proper is obtained by bandpass filtering in module 121 on the basis of the $f_m$ and $f_M$ data and by windowing in module 122 on the basis of the $t_m$ and $t_M$ data.

In accordance with an object of the invention, each signal ($s'_i(t)$) obtained after isolation is processed to provide two right and left signals to be sent to the earphones of a headset. The processing consists in filtering (in module 130) the signal on two filters (131 and 132) whose transfer functions depend on the azimuth $\theta_i$, that is, $A_d(f, \theta_i)$ and $A_g(f,\theta_i)$. For a given azimuth $\theta$, they are different except for the directions 0° and 180° taken with respect to the axis perpendicular to the axis between the two ears.

These transfer functions, $A_d$ and $A_g$, are obtained for each $\theta$ on the basis of the knowledge we have of the human ear. For example, these functions in the amplitude and phase domains are described in an article in JASA Vol. 61, No6, June 1977, FIGS. 11, 12, 14 and 15, which is hereby incorporated by reference.

The two filters take the form of digital filters whose coefficients are tabulated in memory as a function of the azimuth, $\theta_i$.

All n signals ($s_g(t)$ and $s_d(t)$) thus obtained are separately added in modules 141 and 142 and the two output signals are sent to the headset earphones.

Isolating pulses in the frequency and time domains avoids the operator's attention being drawn to information that is not part of the pulse but that is contained in the background noise. Thus, as a variant, the device makes provision to eliminate the background noise of the signal being listened to. To this goal, the selected duration, $\Delta t_i$, is increased so as to be able to perform spectral analysis of a part of the signal located before the noise pulse (by FFT), then, after performing spectral analysis of the noise pulse, the noise pulse is subtracted line by line and we return to the time signal by an inverse FFT.

In accordance with another variant of the invention, the sonar provides contact direction as a tilt angle and the transfer functions are determined according to azimuth and tilt angle as described in the article previously referred to, notably in FIGS. 13 and 16. A 3D audio system is thus obtained.

The device that is an object of the invention can also be used to ascertain the sonar carrier's own "impulsive" noise. This noise is characterized by the fact that it generally comes from several directions and the device that is the object of the invention can measure these directions.

What is claimed is:

1. Panoramic audio device for passive sonar used to study impulsive noise including an audio processing chain for contact signals, comprising:

a device for forming beams in the direction of each contact;

an isolation module for isolating, in the frequency and time domains, each contact signal in each beam, wherein a left and a right signal correspond to each isolated contact signal;

a contact analysis module having two processing modules for each signal thus isolated in each beam by means of filters adapted to the characteristics of the human ear;

a first summation device, summing all the left signals;

a second summation device, summing all the right signals; and a binaural listening device receiving the summed left signals on a left transducer and the summed right signals on a right transducer.

2. The device according to claim 1, wherein the isolation module receives the spectral and temporal limits of the beam from the contact analysis module that analyses the contact signal, in the frequency and time domains.

3. The device according to claim 2, wherein the contact signal analysis module performs spectral analysis and time analysis by an envelope description.

4. The device according to claim 2, wherein the isolation module subtracts the background noise from the contact signal.

5. The device according to claim 1, wherein the amplitude and phase transfer functions of the right-left processing modules are obtained on the basis of the characteristics of the human ear.

6. The device according to claim 1, wherein the direction of each contact provided by the sonar is determined by the azimuth of the sonar beam in which the contact is located.

7. The device according to claim 5, wherein the direction of each contact is completed by the site of the beam of the sonar in which the contact is located.

8. The device according to claim 3, where the isolation module subtracts the background noise from the contact signal.

* * * * *